United States Patent
Yamamoto (10) Patent No.: US 9,678,104 B2
(45) Date of Patent: Jun. 13, 2017

(54) SCANNING PROBE MICROSCOPE (71) Applicant: HITACHI HIGH-TECH SCIENCE CORPORATION, Tokyo (JP)

(72) Inventor: Hiroyoshi Yamamoto, Tokyo (JP)

(73) Assignee: HITACHI HIGH-TECH SCIENCE CORPORATION, Tokyo (JP)

(*) Notice: Subject to any disclaimer, the term of this patent is extended or adjusted under 35 U.S.C. 154(b) by 0 days.

(21) Appl. No.: 14/994,925

(22) Filed: Jan. 13, 2016

(65) Prior Publication Data
US 2016/0282383 A1 Sep. 29, 2016

(30) Foreign Application Priority Data

Mar. 25, 2015 (JP) ................................. 2015-063173

(51) Int. Cl.
*G01Q 20/02* (2010.01)
*G01Q 30/02* (2010.01)

(52) U.S. Cl.
CPC ........... *G01Q 20/02* (2013.01); *G01Q 30/025* (2013.01)

(58) Field of Classification Search
CPC ............................. G01Q 20/02; G01Q 30/025
See application file for complete search history.

(56) References Cited

U.S. PATENT DOCUMENTS 6,642,517 B1 * 11/2003 Ghislain ................ B82Y 35/00
250/306
7,571,638 B1 * 8/2009 Kley ....................... B82Y 15/00
73/105

FOREIGN PATENT DOCUMENTS

JP 2012-225722 11/2012
WO 2006090593 8/2006

* cited by examiner

*Primary Examiner* — Nicole Ippolito
*Assistant Examiner* — Sean Luck
(74) *Attorney, Agent, or Firm* — Hamre, Schumann, Mueller & Larson, P.C.

(57) ABSTRACT

A scanning probe microscope capable of controlling a decrease of the resolution of an objective lens disposed in the scanning probe microscope, and capable of easily carrying out the adjustment of an optical axis of an optical lever using the objective lens. The scanning probe microscope includes: a cantilever having a probe; a light source part radiating beams; a first reflective part reflecting an incident beam (L0) and guiding the incident beam to a reflective surface; a light receiving part receiving the beams; a second reflective part reflecting a reflected beam (L1) and guiding the reflected beam to the light receiving part; and an objective lens disposed to face the cantilever and adopted to observe and capture an area around the cantilever, the objective lens having the number of openings of NA, wherein the first reflective part is disposed at a position between the objective lens and the cantilever.

8 Claims, 7 Drawing Sheets

SCANNING PROBE MICROSCOPE

CROSS REFERENCE TO RELATED APPLICATION(S)

This application claims the benefit of Japanese Patent Application No. 2015-063173, filed on Mar. 25, 2015, which is hereby incorporated by reference in its entirety into this application.

BACKGROUND OF THE INVENTION

1. Technical Field

The present invention relates generally to a scanning probe microscope and, more particularly, to a scanning probe microscope that measures information on various physical properties of a sample, such as a surface shape, viscoelasticity or the like, in such a manner as to bring a probe near to a surface of the sample to scan the sample.

2. Description of the Related Art

As well known to those skilled in the art, a scanning probe microscope (SPM) measures a surface shape of a sample in such a manner as to bring a probe attached to a front end of a cantilever near to or in contact with a surface of the sample. A scanning probe microscope in which an optical lever method of radiating a laser beam to a rear surface of a front end of a cantilever to detect a reflected beam is adopted is known as such a scanning probe microscope. According to the optical lever method, a dislocation of the reflective beam of a beam radiated to the cantilever is detected as a displacement of the cantilever, and the surface of the sample is scanned such that a displacement amount of the cantilever is feedback-controlled to be uniformly maintained. Furthermore, physical properties such as a surface shape, viscoelasticity or the like of the surface of the sample can be measured by setting a feedback controlling signal as information on the physical properties.

However, when such an optical lever method is used, the [adjustment of an optical axis] is needed such that a position of a laser beam or a detector is adjusted so that intensity of a reflective beam reflected from the cantilever becomes the highest. Thus, a technology for guiding laser beams emitted from a side to a lower portion using a beam splitter and radiating the laser beams to the cantilever by installing an optical microscope and a video camera just above the cantilever, and disposing the beam splitter on an optical axis of the optical microscope has been developed (Patent Document 1). According to this technology, the adjustment of the optical axis can be easily carried out because some of the laser beams are headed for upwards via the beam splitter, and a position of the laser beams can be directly confirmed by the optical microscope.

In addition, a measurement site of the optical microscope is needed to be specified before measurement of the sample. Thus, the applicant has developed a technology for disposing an optical microscope at a position corresponding to an upper portion or a lower portion of a cantilever and slantingly radiating a laser beam so that the laser beam is not radiated to the optical microscope (Patent Document 2). According to this technology, since a reflective part changing a path of the laser beam is disposed beyond a visual field of the optical microscope, observation of the sample can be clearly carried out using the optical microscope.

PRIOR ART DOCUMENT (Patent Document 1): Japanese Patent Laid-Open Publication No. 2012-225722
(Patent Document 2): International Laid-Open Publication No. 2006/090593 (FIG. 7)

SUMMARY OF THE INVENTION

However, the technology described in Patent Document 1 is problematic in that the resolution of a microscope is decreased because a beam splitter (reflective part) is disposed on an optical axis of an optical microscope and blocks a center of the optical axis of the optical microscope.

Meanwhile, in the technology described in Patent Document 2, the resolution of a microscope is not decreased because a reflective part is disposed beyond a visual field of the optical microscope. However, when the adjustment of an optical axis is carried out according to the technology described in Patent Document 2, since a laser beam is radiated and reflected beyond the visual field of the optical microscope, the laser beam cannot be directly observed by the optical microscope. Accordingly, there is a need to introduce the laser beam to the visual field of the optical microscope by scattering the laser beam using a scattering plate and the like, and it may be difficult to adjust the optical axis.

Accordingly, the present invention has been made keeping in mind the above problems occurring in the prior art, and an object of the present invention is to provide a scanning probe microscope that can control a decrease of the resolution of an objective lens disposed in the scanning probe microscope and can also easily carry out the adjustment of an optical axis of an optical level using the objective lens.

In order to accomplish the above object, the present invention provides a scanning probe microscope, including: a cantilever having a probe that is positioned close to a surface of a sample; a light source part radiating beams; a first reflective part reflecting an incident beam L0 radiated from the light source part and guiding the incident beam to a reflective surface installed at the cantilever; a light receiving part receiving the beams; a second reflective part reflecting a reflected beam L1 reflected from the reflective surface and guiding the reflected beam to the light receiving part; and an objective lens disposed to face the cantilever and adopted to observe and capture an area around the cantilever, the objective lens having the number of openings of NA, wherein the first reflective part is disposed at a position between the objective lens and the cantilever such that an angle φ between an optical path of the incident beam L0 reflected from the first reflective part, and an optical axis O of the objective lens is $0° < \phi < \theta$, where $\theta$ is an opening angle (°), and $NA = n \cdot \sin\theta$, n representing an index of refraction of a medium between the objective lens and the cantilever.

According to the scanning probe microscope, when [a rough adjustment] may be performed such that a position of the light source part is adjusted so that the incident beam L0 is laid over the reflective surface of the cantilever, the first reflective part does not block a center of the optical axis of the objective lens so that the decrease of a resolution of the objective lens can be controlled. In addition, since the first reflective part deviates from the optical axis of the objective lens, the intensity of a reflective beam from a surface of the sample may be prevented from being too strong, and the reflective beam may be easily observed compared to a case in which the first reflective part is present on the optical axis. Meanwhile, since the first reflective part may be located within a visual field of the objective lens at which the number of the openings is determined as NA, and the reflected beam may be directly observed by the objective lens, intensity of the reflective beam can be easily confirmed by the objective lens.

The first reflective part may be disposed at a position that satisfies $3° \leq \phi \leq 10°$.

Although the first reflective part does not block the optical axis O when the first reflective part is disposed at a position that satisfies $0° < \phi$, the first reflective part actually covers a region having some size in the vicinity of a point on the optical path to which the incident laser beam is incident, rather than at the point on the optical path, and the beam emitted from the light source part also spreads to a degree. Thus, when the first reflective part is disposed at the position that satisfies $3° \leq \phi$, this allows a member of the first reflective part in the vicinity of the point on the optical path not to surely block the optical axis.

The second reflective part may be disposed at a position between the objective lens and the cantilever such that an optical path of the reflected beam L1 reflected from the reflective surface, and the optical axis O of the objective lens is greater than θ.

According to such a scanning probe microscope, since the second reflective part is disposed at a position of $θ < \phi$ that is an outer side of an observation visual field determined by the NA of the objective lens, the decrease of a resolution of the objective lens can be further controlled.

The scanning probe microscope may further include a radiation position adjusting mechanism adjusting a position, in which the incident beam L0 is radiated to the reflective surface, in such a manner as to adjust a position of the light source part by being connected to the light source part.

According to such a scanning probe microscope, after the [rough adjustment] has been performed, [a fine adjustment] may be easily carried out in such a manner that a position of the light source part (radiation position) is adjusted so that optical intensity of the reflected beam L1 from the cantilever becomes the strongest just before reaching the light receiving part.

The scanning probe microscope may further include a light receiving position adjusting mechanism adjusting a position, in which the reflected beam L1 is received in the light receiving part, in such a manner as to adjust a position of the light receiving part by being connected to the light receiving part.

According to such a scanning probe microscope, after the [fine adjustment] has been carried out, a position of the light receiving part may be easily adjusted such that beam-receiving intensity of the reflective beam L1 reflected from the cantilever becomes the highest.

The scanning probe microscope may further include a sample stage on which the sample is placed, the sample stage having a cantilever feed mechanism that can maintain one or more cantilevers.

According to such a scanning probe microscope, the cantilever may be easily and rapidly exchanged via a cantilever feed mechanism in the vicinity of the sample stage.

The scanning probe microscope may further include a sample stage on which the sample is placed, the sample stage being movable to be laid over the probe in the direction of optical axis O upon measurement of the sample.

According to such a scanning probe microscope, after the [rough adjustment] has been carried out by moving the sample stage to a position that deviates from the probe in a direction of the optical axis O, the sample stage may be returned to its original position, thereby enabling a return to general measurement.

The sample stage may maintain the cantilever in a same direction as a direction upon the measurement, and the sample stage having an optical reflective surface for matching an optical axis of the incident beam with the maintained cantilever and reflecting the incident beam L0.

According to the scanning probe microscope, although a radiation position adjusting mechanism for adjuring a position of the light source part is not provided, the [rough adjustment] can be performed by observing, by the objective lens, a reflected beam from an optical reflective surface installed at the cantilever feed mechanism rather than a reflected beam from the surface of the sample.

In addition, according to the kind or surface state of the sample, although the reflected beam from the surface of the sample may not have sufficient intensity, since a reflected beam from the optical reflective surface may secure a fixed intensity, the [rough adjustment] can be easily performed.

According to the present invention, the decrease of a resolution of the objective lens disposed at the scanning probe microscope can be controlled, and the adjustment of the optical axis of an optical lever can be easily carried out using the objective lens.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will be described in detail below with reference to the accompanying drawings. Repeated descriptions and descriptions of known functions and configurations that have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Figure 1:
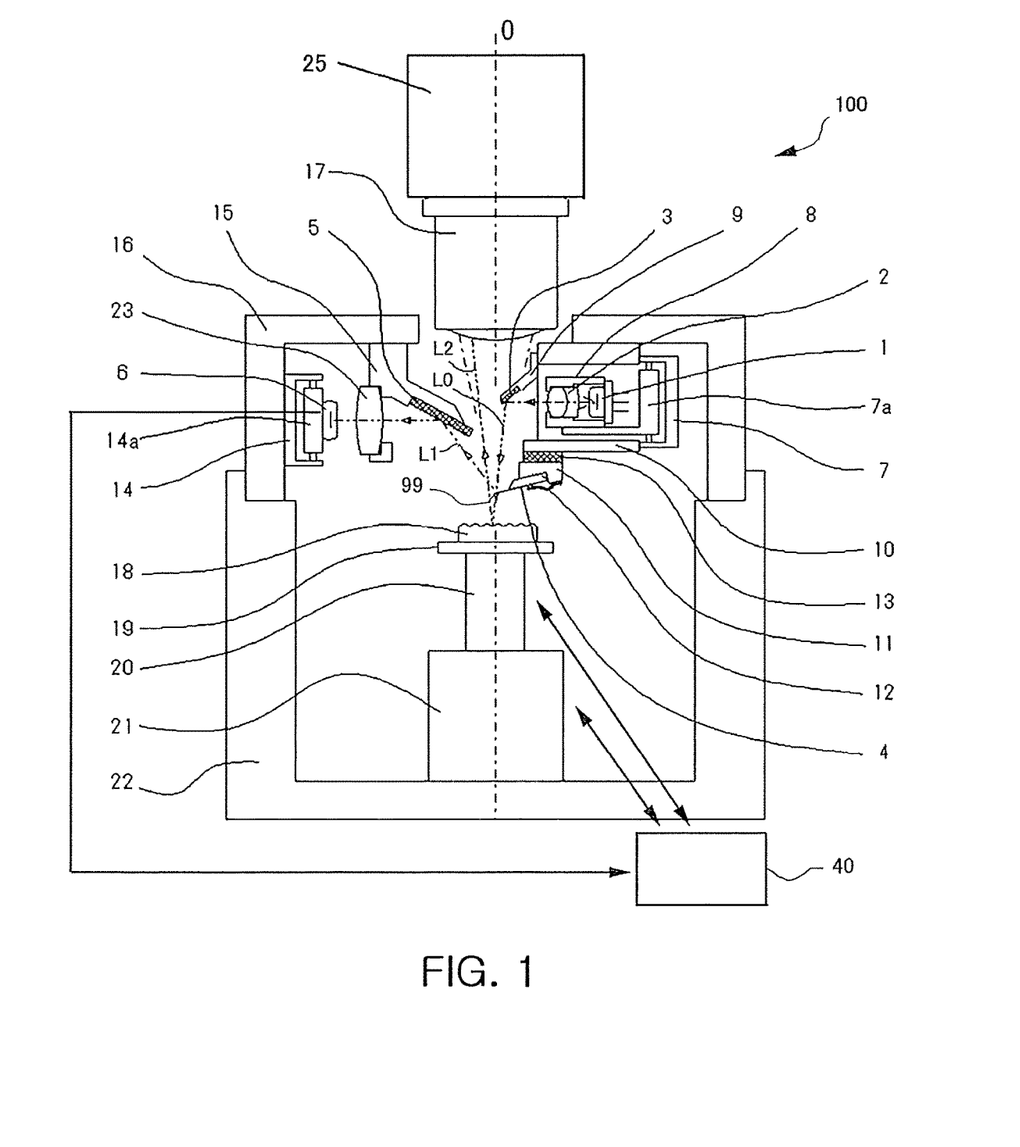
FIG. 1 is a block diagram showing a scanning probe microscope according to a first embodiment of the present invention.
Figure 2:
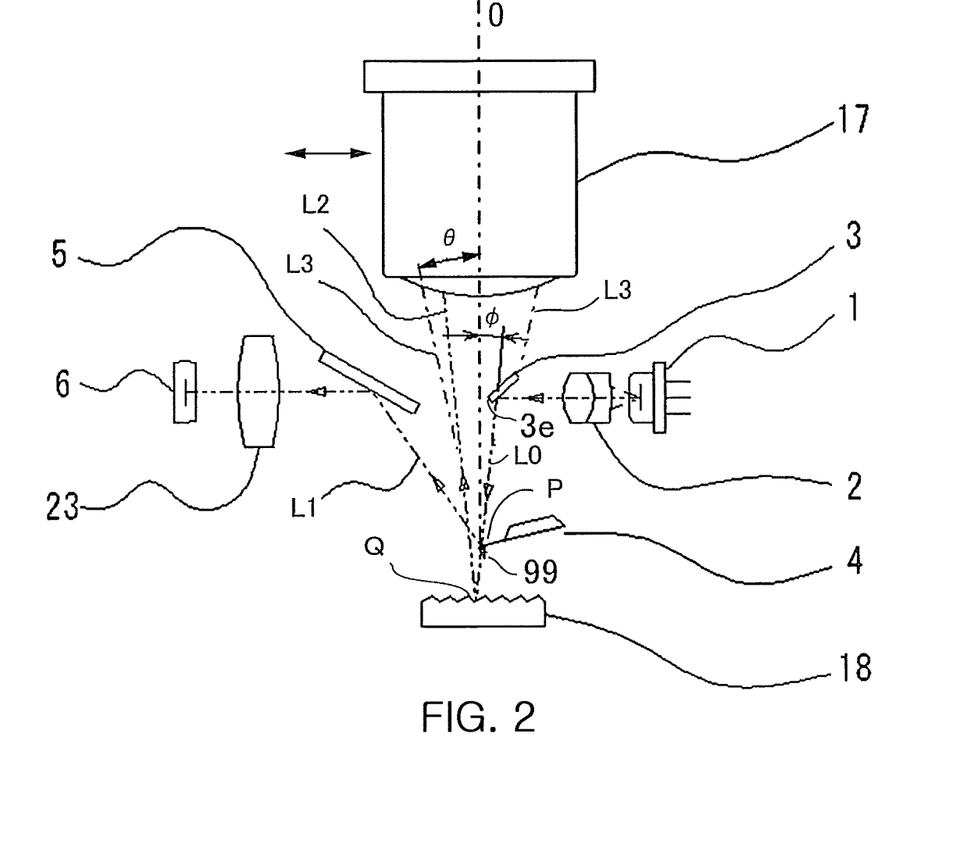
FIG. 2 is a partially enlarged view of FIG. 1.

FIG. 1 is a block diagram showing a scanning probe microscope 100 according to a first embodiment of the present invention, and FIG. 2 is a partially enlarged view showing the neighborhood portion of a cantilever 4 of FIG. 1.

As shown in FIG. 1, the scanning probe microscope 100 includes: a cantilever 4 having a probe 99 at a front end thereof, the probe being disposed to be near a surface of a sample 18; a sample stage 19 disposed at a position corresponding to a lower portion of the cantilever 4 and adopted to place a sample 18 thereon; a light source part (semiconductor laser light source) 1 radiating laser beams used in an optical lever; a first reflective part (first mirror) 3; a light receiving part (four-divided beam detecting element) 6 receiving laser beams; a second reflective part (second mirror) 5; an objective lens 17 disposed to face the cantilever 4 and the sample 18; a control means 40, and the like. In addition, beams collected on the objective lens 17 are observed or captured from an optical microscope body 25.

In addition, the scanning probe microscope 100 according to the first embodiment has such a sample scanning mode as to scan the sample 18 in a state where the cantilever 4 is fixed.

The light source part 1 is disposed at a position between the objective lens 17 and the cantilever 4 that satisfies $\theta < \phi$ at an outer side farther than the objective lens 17, the light source part radiating laser beams sideward. The first reflective part 3 reflects the laser beams radiated from the light source part 1 downwards and guides the laser beams to a reflective surface (not shown) installed on a rear surface of the cantilever 4. The second reflective part 5 reflects the laser beams reflected upwards from the reflective surface of the cantilever 4 sideward, thereby guiding the laser beams to a light receiving part 6. The light receiving part 6 is disposed at a position corresponding to an outer side farther than the second reflective part 5 such that a light receiving surface faces a sideward portion.

The control means 40 controls an operation of the scanning probe microscope 100 and includes a controller, a computer, and the like. The computer includes a control board; a central processing unit (CPU); a memory means, such as a ROM, a RAM, a hard disc, and the like; and an interface, a controller, and the like.

The sample stage 19 is attached to an upper portion of a fine movement mechanism (scanner) 20, and the fine movement mechanism 20 is attached to an upper portion of a rough movement mechanism 21. In addition, the rough movement mechanism 21 is fixed a base part (housing) 22.

The rough movement mechanism 21 approximately three-dimensionally moves the fine movement mechanism 20 and the sample stage 19 arranged at the upper portion thereof, and an operation of the rough movement mechanism is controlled by the control means 40.

The fine movement mechanism 20 three-dimensionally moves (fine movement) the sample stage 19 (and the sample 18), and is a cylindrical scanner (actuator) that includes two (biaxial) piezoelectric elements scanning the sample stage 19 in an xy direction (a plane of the sample 18), and another piezoelectric element scanning the sample stage 19 in a z (height)-direction. The piezoelectric element is an element that is configured such that a crystal material is twisted when an electric field is applied, and an electric field is generated when the crystal material is forcibly twisted by an external force. A lead zirconate titanate (PZT), which is a kind of ceramic, may be generally used as the piezoelectric element, but the piezoelectric element is not limited thereto.

The piezoelectric elements are driven in the xy-direction, and z-direction, respectively by a predetermined control signal (voltage) provided from the control means 40.

Furthermore, the sample 18 is placed on the sample stage 19, and the sample 18 is disposed to face a probe 99.

The cantilever 4 has a body part and a tip part and is configured such that the tip part contacting a side of the body part has the structure of a cantilever spring. The cantilever 4 is closely attached to an inclined surface block 11 by a fixing part (spring) 12 of the cantilever, and the inclined surface block 11 is fixed to the exciter (vibrator) 13. Furthermore, the exciter 13 is vibrated by an electrical signal from excitation power (not shown), thereby vibrating the cantilever 4 and the probe 99 arranged at a front end of the cantilever. Examples of the excitation method of the cantilever may include a piezoelectric element, an electric field or a magnetic field, light radiation, a current carrying method or the like. The exciter 13 is used when a shape of the sample is observed in a dynamic force microscope mode (DFM measurement mode) in which the cantilever is forcibly vibrated in the vicinity of a resonant frequency.

Furthermore, a vertical (z-direction) movement amount of the cantilever 4 is reflected in a change (incidence position) in an optical path of the laser beams incident to the light receiving part 6. Accordingly, based on the incidence position, a displacement amount of the cantilever 4 is detected by the light receiving part 6. Thus, the displacement of the cantilever 4 generated by an interatomic force, which acts between the sample 18 and the probe 99, is detected by the light receiving part 6. Further, a displacement of the fine movement mechanism 20 is caused in the z-direction such that a vibration amplitude of the probe 99 (cantilever 4) becomes a target amplitude, and a contact force between the probe 99 and the sample 18 is controlled. In this state, the fine movement mechanism 20 is moved in the xy-direction to scan the sample 18, and maps a shape or property value of the surface of the sample using a DFM measurement mode.

The computer 40 controls each operation of the probe microscope 100 and introduces and controls measured data, and the computer realizes the measurement of a surface shape measurement, the measurement of physical properties, and the like. Furthermore, with regard to displacement within surfaces of the sample stage 19 in the xy-direction, (i) a three-dimensional shape image from displacement in a height of the sample stage 19, (ii) a phase image from the value of a phase in a resonance state, (iii) an error signal image by a difference with a target value of the vibration amplitude, and (iv) a multi-functional measurement image from property values between the probe and the sample are displayed on the computer 40 so that analysis or processing is performed, thereby enabling the operation of the probe microscope.

In addition, an optical head housing 16 is fixed to an upper portion of a frame body of the frame-shaped base part 22, and a central portion of an upper surface of the optical head housing 16 is open. Furthermore, the objective lens 17 is installed at the opening, and faces the cantilever 4 and the sample 18 arranged at a lower portion through the opening.

Further, a module 10 on a side at which the light source is arranged is attached to the optical head housing 16, and a biaxial adjustment stage 7 on the side at which the light source is arranged is disposed in the module 10 on the side at which the light source is arranged. A biaxial adjustment mechanism 7a is mounted to the biaxial adjustment stage 7 on the side at which the light source is arranged so that a light source holder 8 is attached to the biaxial adjustment mechanism 7*a*. The light source part 1 and a first condensing lens 2 are maintained in the light source holder 8, the first condensing lens collecting the laser beams emitted from the light source part 1. In addition, a first mirror holder 9 is fixed to the module 10 on the side at which the light source is arranged, and a first reflective part 3 is attached to the first mirror holder 9.

Furthermore, the biaxial adjustment mechanism 7*a* is adjusted in two directions, such as the z-direction and y-direction (or x-direction), thereby carrying out ⌈adjustment of an optical axis⌋ for adjusting a position of the laser beams emitted from the light source part 1 such that the laser beams emitted from the light source part 1 are laid over a reflective surface of the cantilever. Also, the exciter 13 is attached to a lower portion of the module 10 on the side at which the light source is arranged.

The biaxial adjustment mechanism 7*a* corresponds to ⌈a radiation position adjusting mechanism⌋ of the claims.

In addition, a second mirror holder 15 is fixed to the optical head housing 16, and the second reflective part 5 and a second condensing lens 23 are attached to the second mirror holder 15. The second condensing lens 23 collects the laser beams reflected from the cantilever 4 on the light receiving part 6. In addition, a biaxial adjustment stage 14 on a side at which beams are received is arranged is attached to the optical head housing 16, and a biaxial adjustment mechanism 14*a* is mounted to the biaxial adjustment stage 14 on the side at which the beams are received is arranged so that the light receiving part 6 is attached to the biaxial adjustment mechanism 14*a*. Further, the biaxial adjustment mechanism 14*a* is adjusted in two directions, such as the z- and y-directions (or x-direction), thereby carrying out ⌈adjustment of an optical axis⌋ for adjusting a position of the light receiving part 6 so that light-receiving intensity of reflective beams reflected from the cantilever 4 can increase.

The biaxial adjustment mechanism 14*a* corresponds to ⌈a light-receiving position adjusting mechanism⌋ of the claims.

Next, an arrangement and optical axis adjustment of the first reflective part 3, which is a distinctive portion of the present invention, will be described with reference to FIGS. 2 and 3.

As shown in FIG. 2, the sample stage 19 on which the sample 18 is placed is horizontal, and an optical axis O of the objective lens 17 is vertical. Also, in the present embodiment, a reflective surface of the cantilever 4 is inclined rightwards and upwards of FIG. 2 at an angle of about 11° with respect to a horizontal surface. Furthermore, when the number of openings of the objective lens 17 is NA, this is represented by $NA = n \cdot \sin \theta$. Here, $\theta$ is an angular aperture (°), n is the refractive index of a medium (generally, air) between the objective lens 17 and the cantilever 4 (a surface of the sample 18).

Here, the first reflective part 3 is disposed between the objective lens 17 and the cantilever 4 such that an angle $\phi$ between an optical path of an incident laser beam L0 reflected from the first reflective part 3, and an optical axis O of the objective lens becomes $0° < \phi < \theta$. In addition, in the present embodiment, the first reflective part 3 satisfies $\phi = 6°$. Also, a point of intersection of the optical path of the incident laser beam L0 reflected from the first reflective part 3, and the reflective surface of the cantilever 4 is P.

In this case, since the reflective surface of the cantilever 4 is slantingly inclined with respect to a horizontal plane, the incident laser beam L0 incident to the cantilever 4 becomes a reflected beam L1 having an angle ($\theta < \phi$ in the embodiment of FIG. 2) that is inclined outwards with respect to the optical axis O farther than the first reflective part 3 at the point of intersection. Thus, the incident laser beam is incident to the second reflective part 5, and is detected by the light receiving part 6.

In addition, the fact that the first reflective part 3 is disposed to satisfy $0° < \phi < \theta$ means that the first reflect part 3 is disposed to satisfy $0° < \phi < \theta$ at a position (theoretically, a point) that reflects the incident laser beam L0. However, in practice, the first reflective part 3 covers a region having a size in some degree at the periphery of the position, as well as the position (point) that reflects the incident laser beam L0. Accordingly, all portions of the first reflective part 3 are not needed to be disposed at the position that satisfies $0° < \phi < \theta$. For example, the outermost portion of the first reflective part 3 far away from the optical axis O may be disposed outwards farther than $\theta$ (i.e., beyond an observation visual field of the objective lens 17). However, the closest portion of the first reflective part 3 to the optical axis O (e.g., a member 3*e* of FIG. 2) needs to be disposed at a position in which the optical axis O is not blocked, namely, a position in which the member 3*e* becomes larger than 0°.

Meanwhile, the second reflective part 5 needs to be disposed in an optical path of a reflected beam L1 in which the incident laser beam L0 is reflected upwards at the reflective surface of the cantilever 4. Here, the optical path of the reflected beam L1, namely, a position of the second reflective part 5 is determined by an angle of incidence of the incident laser beam L0 and a gradient of the reflective surface of the cantilever 4. For example, as previously described, in the case of a gradient of the reflective surface of the cantilever 4 with respect to a horizontal plane is 11° and $\phi = 6°$, the optical path of the reflected beam L1 forms an angle of 28° (6+11×2) with respect to the optical axis O of the objective lens 17.

In addition, in the present embodiment, the second reflective part 5 is disposed between the objective lens 17 and the cantilever 4 such that an angle between the optical axis O and the optical path of the reflected beam L1 from the reflective surface of the cantilever 4 becomes greater than $\theta$ (beyond the observation visual field of the objective lens 17). Thus, since the second reflective part 5 does not block the objective lens 17, the decrease of a resolution of the objective lens 17 can be further controlled. However, as described later, the second reflective part 5 may be disposed so that an angle between the optical axis O and the optical path of the reflected beam L1 is equal to or less than $\theta$, and the observation visual field of the objective lens 17 may be slightly blocked.

In addition, the fact that the second reflective part 5 is disposed to be greater than $\theta$ means that the second reflective part 5 is disposed at a position (theoretically, a point), that reflects the reflected beam L1, to be greater than $\theta$. Accordingly, all portions of the second reflective part 5 are not needed to be disposed at the position where all the portions are greater than $\theta$. For example, the second reflective part may be disposed at a position where a portion of the second reflective part 5 nearest to the optical axis O is equal to or less than $\theta$.

Next, an ⌈adjustment of the optical axis⌋ in which a position of the light source part 1 is adjusted so that the reflected beam L1 reflected from a point of intersection P of the cantilever 4 is most strongly received in the light receiving part 6 will be described.

Figure 4:
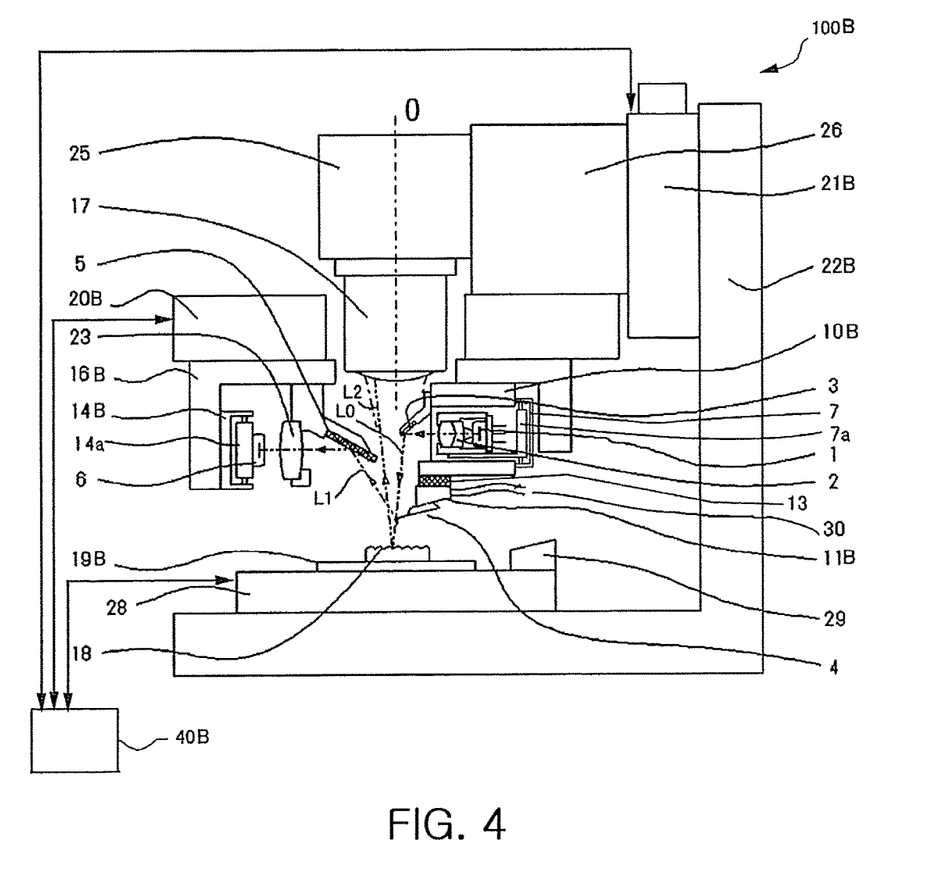
FIG. 4 is a block diagram of a scanning probe microscope according to a second embodiment of the present invention.

In addition, the present invention facilitates ⌈a rough adjustment⌋ in which a position of the light source part 1 (a position of the cantilever 4 in the case of the lever scanning method of FIG. 4) is adjusted such that the incident laser beam L0 is laid over the reflective surface of the cantilever

40 during [the adjustment of the optical axis]. Then, like in the past, [a fine adjustment] is carried out in such a manner that a position of the light source part 1 (radiation position) is adjusted so that optical intensity of the reflected beam L1 from the cantilever 4 becomes the strongest just before reaching the light receiving part 6. Also, a position of the light receiving part 6 is adjusted such that the light receiving intensity of a reflected beam reflected from the cantilever 4 becomes the highest.

First, as shown in FIG. 2, the position of the light source part 1 is adjusted such that the optical axis of the objective lens 17 crosses a point Q on the surface of the sample 18, the point Q being located to slightly deviate from the point of intersection P. In this case, the incident laser beam L0 from the first reflective part 3 to a lower portion is incident to the point Q at an angle of $0°<\phi=\theta$, and is reflected from the point Q at the angle of $0°<\phi 21\ \theta$, so that the incident laser beam becomes a reflected beam L2. The objective lens 17 may observe, through its observation visual field, only beams passing through an inner portion of a conical surface L3 having an angle corresponding to the opening angle $\theta$ with respect to the optical axis O. However, since the angle of reflection of the reflected beam L2 by the point Q satisfies $\phi<\theta$, the reflected beam L2 can be directly observed by the objective lens 17 (see FIG. 3).

In addition, the reflected beam L2 is symmetric to the incident laser beam L0 with respect to the optical axis O, and the incident laser beam L0 is radiated from the inner portion of the conical surface L3. Due to this, the reflected beam L2 necessarily passes through the inner portion of the conical surface L3 and is directly observed by the objective lens 17.

Figure 3:
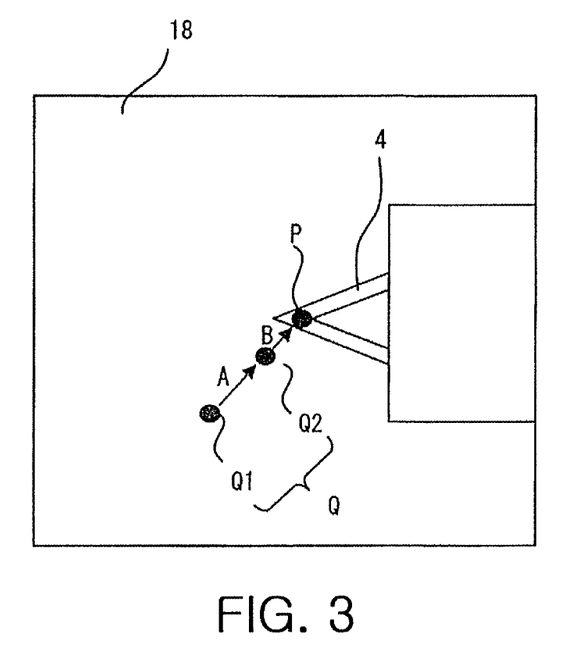
FIG. 3 is a mimetic diagram showing reflected light from points on the surface of a sample observed by an objective lens

FIG. 3 shows the reflected beam L2 from the point Q (Q1, Q2) observed by the objective lens 17. A bright spot of the reflected beam L2 and a picture of the cantilever 4 are observed by the objective lens 17. Here, when the reflected beam L2 from the point Q1 is observed by the objected lens 17 to be closer to the reflective surface (the point of intersection P) of the cantilever 4, and a position of the light source part 1 is adjusted, the bright spot of the reflected beam L2 from the point Q2 is observed. The point Q2 represents the optical axis O on the surface of the sample 18 that is closer to the cantilever 4 to the extent of a distance A than Q1.

Next, when the reflected beam L2 is observed by the objective lens 17 to be closer to the reflective surface (the point of intersection) of the cantilever 4, and the position of the light source part 1 is adjusted, an optical path of the reflected beam L2 is changed to the optical path of the reflected beam L1 at the time when the incident laser beam L0 is radiated to the cantilever 4, and the reflected beam L2 disappears from an observation picture. Due to this, it can be seen that the incident laser beam L0 is laid over the reflective surface of the cantilever 4, and the [rough adjustment] ends.

As described above, according to the present embodiment, the adjustment of the optical axis, which is performed in such a manner that the incident beam L0 from the light source part 1 is laid over the reflective surface of the cantilever 4, is easily realized because the reflective beam L2 from the surface of the sample 18 in the vicinity of the cantilever 4 can be directly observed by the objective lens 17.

Furthermore, the beam from the light source part 1 is incident to the cantilever 4 by the first reflective part 3, and the first reflective part 3 deviates from the optical axis O of the objective lens 17 $(0°<\phi)$ and does not block the optical axis, the decrease of a resolution of the objective lens 17 can be controlled. In addition, since the first reflective part 3 deviates from the optical axis O of the objective lens 17, in a state where intensity of the reflected beam L2 from the surface of the sample 18 does not become too strong, the reflected beam can be easily observed compared to the case in which the first reflective part 3 is present on the optical axis.

In addition, since the second reflective part 5 is disposed at a position of $\theta<\phi$ that is an outer side of the observation visual field determined by the NA of the objective lens 17, the decrease of a resolution of the objective lens 17 can be better controlled.

It is preferable that the first reflective part 3 be disposed at a position that satisfies $3°\le\phi\le10°$. Although the first reflective part 3 does not block the optical axis when the first reflective part 3 satisfies $0°<\theta$, the first reflective part 3 covers a region having some size in the vicinity of a point on the optical path to which the incident laser beam L0 is incident, rather than at the point on the optical path, and the beam emitted from the light source part 1 also spreads to a degree. Due to this, as shown in FIG. 2, the member 3e of the first reflective part 3 is also mounted inwards farther than the reflection position of the first reflective part 3.

Thus, when $3°\le\phi$ is satisfied, this condition may surely prevent the member 3e from blocking the optical axis O. In addition, about $\phi\le10°$ is satisfied from a value of the NA that can be realized by the general objective lens 17.

It is more preferable that the first reflective part 3 be disposed at a position that satisfies $3°<\phi<10°$.

Next, a scanning probe microscope 100B according to a second embodiment of the present invention will be described with reference to FIGS. 4 and 5. In addition, the scanning probe microscope 100B according to the second embodiment is composed of a lever scanning mode for scanning and measuring a side at which the cantilever is arranged. The same elements as those of the scanning probe microscope 100 according to the first embodiment refer to the same reference numerals, and the description thereof is omitted.

As shown in FIG. 4, the scanning probe microscope 100B includes: a cantilever 4 having a probe 99 at a front end thereof; a sample stage 19 that is disposed at a position corresponding to a lower portion of the cantilever 4, and on which a sample 18 is placed; a light source part 1 radiating laser beams used in an optical level; a first reflective part 3; a light receiving part 6; a second reflective part 5; an objective lens 17 disposed to face the cantilever 4 and the sample 18; an optical microscope body 25; a control means 40B, and the like.

Like the first embodiment, the light source part 1 is disposed a position between the objective lens 17 and the cantilever 4 that satisfies $0°<\theta<\phi$. In addition, the first reflective part 3 is disposed at a position between the objective lens 17 and the cantilever 4 that satisfies $0°<\phi<\theta$, and the second reflective part 5 is disposed at a position between the objective lens 17 and the cantilever 4 that satisfies $\theta<\phi$.

The sample stage 19B is attached to an upper portion of an XY stage 28, and the XY stage 28 is fixed to a base part (housing) 22B. The XY stage 28 approximately three-dimensionally moves the sample stage 19B, and adjusts a positional relationship between the cantilever 4 and the sample 18, and an operation of the XY stage 28 is controlled by the control means 40. Further, the sample 18 is put on the sample stage 19B, and the sample 18 is disposed to face the probe 99. In addition, a cantilever feed mechanism 29 having a plurality of replacement cantilevers is disposed on the XY stage 28.

The cantilever 4 is adsorbed and fixed to an inclined surface block 11B via a vacuum pipe 30 installed in the inclined surface block 11B, and the inclined surface block 11B is fixed to an exciter (vibrator) 13.

According to the scanning probe microscope 100B, a displacement detector and the inclined surface block 11 to which the cantilever is attached are integrated, thereby constituting an optical head. In detail, a rough movement mechanism 21B is mounted to the side of a boom portion in a vertical direction of the base part 22B so that a connection part 26 is attached to the rough movement mechanism 21B.

A fine movement mechanism (scanner) 20B having a central part, which is open, is attached to a lower surface of the connection part 26. Further, a frame-shaped optical head housing 16B having a central portion, which is open, is fixed to a lower surface of the fine movement mechanism 20B. The fine movement mechanism 20B three-dimensionally moves the optical head housing 16B, and is a flat scanner (actuator) having a predetermined piezoelectric element. Further, the objective lens 17 is installed in an opening of the optical head housing 16B, and faces the cantilever 4 and the sample 18 arranged at a lower portion via the opening.

In addition, a module 10B on a side at which the light source is arranged is attached to a lower surface of the optical head housing 16B, and a biaxial adjustment stage 7 on the side at which the light source is arranged in disposed in the module 10B on the side at which the light source is arranged. A biaxial adjustment mechanism 7a is mounted to the biaxial adjustment stage 7 on the side at which the light source is arranged so that the light source part 1 and the first condensing lens 2 are installed. In addition, a predetermined mirror holder is mounted to the module 10B on the side at which the light source is arranged so that the first reflective part 3 is attached. Further, like the first embodiment, the biaxial adjustment mechanism 7a is adjusted in two directions, such as a z-direction and y-direction (or x-direction), thereby carrying out [the adjustment of an optical axis] so that the laser beams from the light source part 1 are laid over the reflective surface of the cantilever.

The biaxial adjustment mechanism 7a corresponds to a [radiation position adjusting mechanism] of the claims.

However, according to the second embodiment, due to various reasons, such as the promotion of a reduction in weight of the optical head housing 16B suspended in the fine movement mechanism 20B, or the like, the biaxial adjustment mechanism 7a may not be installed. In this case, as shown in FIG. 5, a reflected beam L2 from an optical axis adjusting mirror 29m installed in the cantilever feed mechanism 29 rather than from a surface of the sample 18 is observed by the objective lens 17, thereby enabling the adjustment of the optical axis to be carried out. Thus, regardless of the presence or absence of the biaxial adjustment mechanism, the adjustment of the optical axis can be performed. In addition, according to the kind or surface state of the sample 18, although the reflected beam L2 from the surface of the sample 18 may not have sufficient intensity, since the reflected beam from the optical axis adjusting mirror 29m may secure a fixed intensity, the reflected beam L2 can be easily observed by the objective lens 17, and the adjustment of the optical axis can be also easily performed. The adjustment of the optical axis using the optical axis adjusting mirror 29m will be described later.

Meanwhile, the exciter 13 is attached to a lower portion of the module 10B on the side at which the light source is arranged, and the cantilever 4 is disposed at a front end of the optical head.

In addition, a predetermined mirror holder is fixed to a lower portion of the optical head housing to face the module 10B on the side at which the light source is arranged, and the second reflective part 5 and a second condensing lens 23 are attached to the mirror holder. Further, a biaxial adjustment stage 14B on a side at which beams are received is attached to the optical head housing 16B, and a biaxial adjustment mechanism 14a is mounted to the biaxial adjustment stage 14B on the side at which the beams are received is arranged so that the light receiving part 6 is attached. Further, the biaxial adjustment mechanism is adjusted in two directions, such as the z-direction and y-direction (or x-direction) so that [the adjustment of the optical axis] can be performed in such a manner that a position of the light receiving part 6 is adjusted such that light receiving intensity becomes the highest.

The biaxial adjustment mechanism 14a corresponds to [a light receiving position adjustment mechanism] of the claims.

Furthermore, the cantilever 4 of the optical head attached at the front end of the fine movement mechanism 20B is scanned in an inward direction of a sample plane XY as a position in a height (z) direction with respect to the sample 18 is controlled. In this case, after the cantilever 4 has been positioned at any position on the surface of the sample 18 by the XY stage 28, the cantilever is sent to a position corresponding to a height, which comes into contact with or is near to the sample 18, by the rough movement mechanism 21B (or the fine movement mechanism 20B)

An amount of vertical (z-direction) movement of the cantilever 4 is reflected in a change (incident position) of the optical path of the laser beams incident to the light receiving part 6. Accordingly, a displacement amount of the cantilever 4 from the incident position is detected by the light receiving part 6. Thus, the displacement of the cantilever 4 generated by an interatomic force, which acts between the sample 18 and the probe 99, is detected by the light receiving part 6. Further, a displacement of the fine movement mechanism 20 is caused in the z-direction such that a vibration amplitude of the probe 99 (cantilever 4) becomes a target amplitude, and a contact force between the probe 99 and the sample 18 is controlled. In this state, a displacement of the fine movement mechanism 20 is caused in the xy-direction to scan the sample 18, and maps a shape or property value of the surface of the sample using a DFM measurement mode.

Thus, the displacement of the cantilever 1 generated upon bringing the probe of the cantilever 4 near to or into contact with the sample 18 may be detected by the optical lever method described above, and the surface of the sample 18 may be scanned and measured in the state where the displacement amount of the cantilever 4 is uniformly maintained by the fine movement mechanism 20B

Next, [an adjustment of the optical axis] will be described with reference to FIG. 5, the adjustment of the optical axis being carried out using the optical axis adjusting mirror 29m in such a manner that the laser beams from the light source part 1 are laid over the reflective surface of the cantilever 4.

Figure 5:
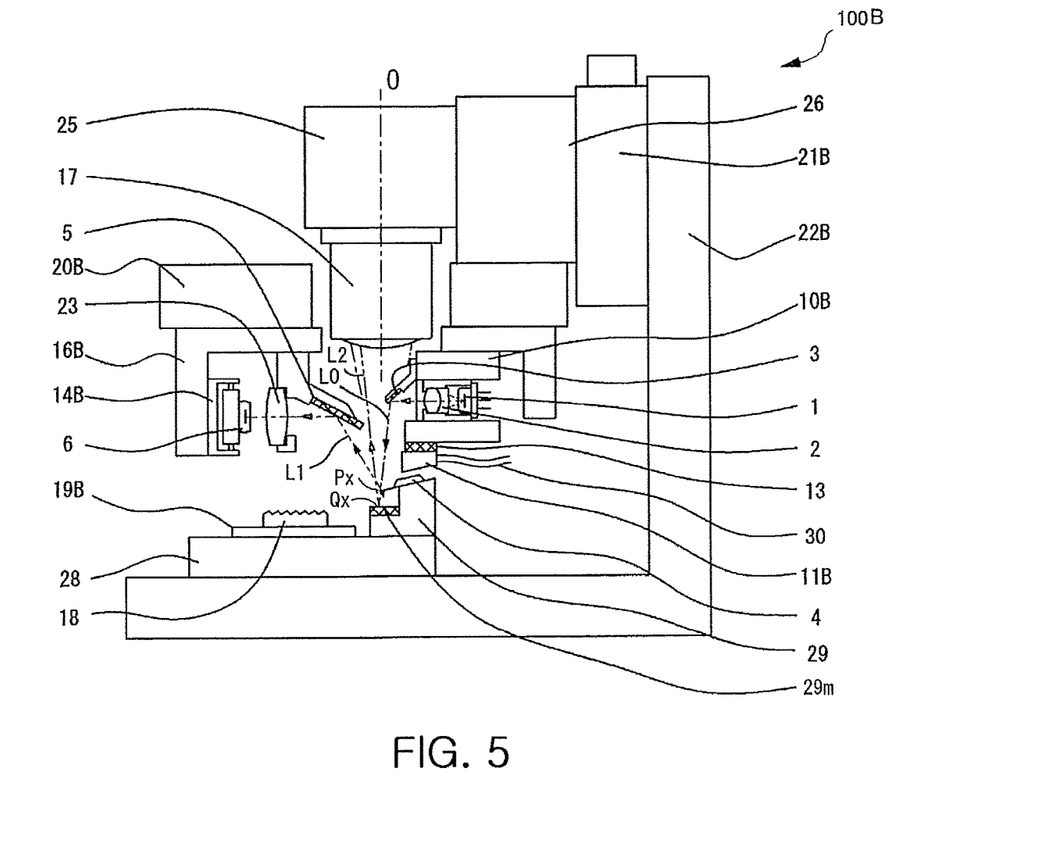
FIG. 5 is a view showing one example of the adjustment of an optical axis of the scanning probe microscope according to the second embodiment of the present invention.

As shown in FIG. 5, the optical axis adjusting mirror 29m (beam reflective surface) is installed on an upper surface of the cantilever feed mechanism 29 so that a reflective surface of the optical axis adjusting mirror is horizontal. Further, the cantilever 4 is maintained on the cantilever feed mechanism 29 at a facing position of the probe corresponding to an upper portion of the optical axis adjusting mirror 29m and at the same gradient as that at which the cantilever 4 is mounted to the inclined surface block 11B.

Here, in the embodiment of FIG. 5, when the optical axis is adjusted, the cantilever 4 has not yet been mounted to the inclined surface block 11B, but has been maintained on the cantilever feed mechanism 29. Furthermore, in this state, the XY stage 28 is adjusted, and a position of the cantilever feed mechanism 29 is adjusted such that the optical axis O of the objective lens 17 crosses a point Qx on the surface of the optical axis adjusting mirror 29m. In this case, the incident laser beam L0 from the first reflective part 3 toward to a lower portion is incident to the point Qx at an angle of $0°<\phi<\theta$ and is reflected from the point Qx at the angle of $0°<\phi<\theta$ so that the incident laser beam becomes a reflected beam L2. Thus, the reflected beam is received in the objective lens 17 so that it can be directly observed by the objective lens.

Thus, a bright spot of the reflected beam L2 and a picture of the cantilever 4 on the cantilever feed mechanism 29 are observed by the objective lens 17. Here, when the reflected beam L2 from the point Qx is observed by the objected lens 17 to be closer to the reflective surface (the point of intersection Px) of the cantilever 4, and a position of the cantilever feed mechanism 29 is adjusted, an optical path of the reflected beam L2 is changed to the optical path of the reflected beam L1 at the time when the incident laser beam L0 is radiated to the cantilever 4, and the reflected beam L2 disappears from an observation picture. Due to this, it can be seen that the incident laser beam L0 is laid over the reflective surface of the cantilever 4.

In addition, although the position of the cantilever 4 on the cantilever feed mechanism 29 and a position of the cantilever after the cantilever has been mounted to the inclined surface block 11B slightly deviate from each other in a major axial direction of the cantilever 4 (left and right directions of FIG. 5), since the position of the cantilever 4 in the state of FIG. 5 is set by predicting such dislocation between the positions, there is no practical problem. Accordingly, in the state of FIG. 5, the position of the cantilever 4 is adjusted so that [a rough adjustment] ends. Then, the cantilever 4 is mounted to the inclined surface block 11B so that measurement is performed. Also, in the state of FIG. 5, when the position of the cantilever 4 is adjusted, a distance in the z-direction between an upper surface of the cantilever 4 and a lower surface of the inclined surface block 11B is generally about 0.5 mm.

According to the second embodiment, since the reflected beam L2 from the surface of the optical axis adjusting mirror 29m (or the sample 18) in the vicinity of the cantilever 4 can be also directly observed by the objective lens 17, the adjustment of the optical axis can be easily performed.

In addition, since the first reflective part 3 does not block the optical axis O of the objective lens 17, the decrease of a resolution of the objective lens 17 can be controlled. Also, since the first reflective part 3 deviates from the optical axis O of the objective lens 17, intensity of the reflective beam L2 from the surface of the optical axis adjusting mirror 29m (or the sample 18) is prevented from being too strong, and the reflected beam L2 is easily observed.

The present invention is not limited to the embodiment described above. For example, a measurement mode of the scanning probe microscope is not limited to the DFM measurement mode described above. In addition to the DFM measurement mode, examples of the measurement mode may include a contact mode or a non-contact mode that measures a surface shape of the sample by uniformly maintaining an interatomic force between the probe and the sample.

In addition, the scanning probe microscope is not limited to measuring the surface shape of the sample and may include measuring information on various physical properties if the measurement is performed in such a manner that scanning is performed by bringing the probe near to or into contact with the sample.

The kind of the light source part, the first reflective part, the light receiving part, and the second reflective part, or the objective lens also is not limited to the embodiment described above.

EXAMPLE

The reflective surface of the cantilever 4 was inclined at an angle of about 11° with respect to a horizontal plane using the scanning probe microscope 100 according to the first embodiment shown in FIGS. 1 and 2, and the first reflective part 3 was disposed at a position satisfying $\phi=6°$. Also, the NA of the objective lens 17 was 0.28, and n was set as the index of refraction in the air. Further, a work dimension (WD) of the objective lens 17 and the reflective surface of the cantilever 4 was 33.5 mm. A super luminescent diode (SLD) was used as the light source 1.

Furthermore, a distance S (mm) in a vertical direction between the probe 99 installed at the front end of the cantilever 4 and the surface of the sample 18 were variously varied. In this state, respective reflected beams observed by the objective lens 17 were captured.

Figure 6:
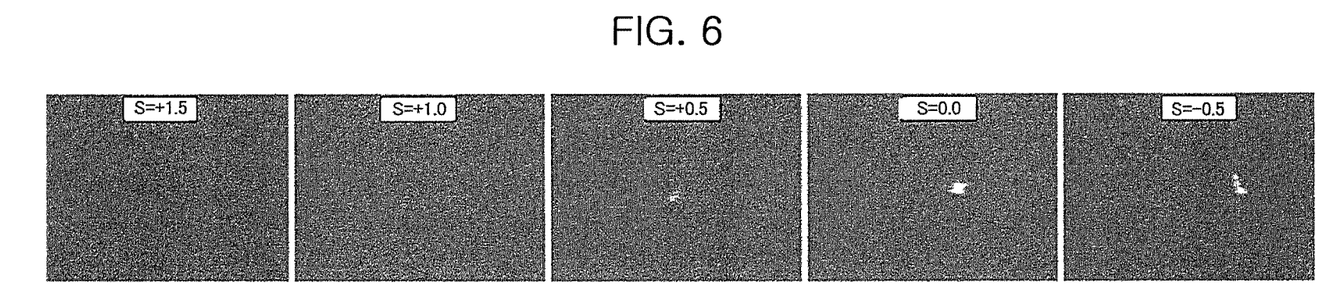
FIG. 6 is a view showing reflected light observed by an objective lens when the scanning probe microscope according to the first embodiment is used.
Figure 7:
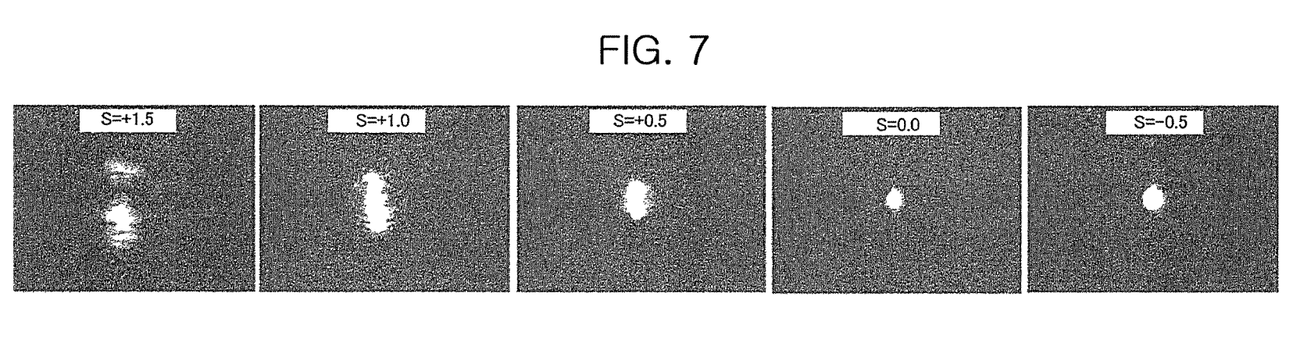
FIG. 7 is a view showing reflected light observed by an objective lens when the scanning probe microscope according to the first embodiment is used, and a first reflective part is disposed on an optical axis of the objective lens.

The obtained result is shown in FIG. 6. In addition, as a comparative example, the first reflective part 3 was disposed at a position satisfying $\phi=0°$, and like the technique described in Patent Document 1, by using the first reflective part 3 as a beam splitter, respective reflected beams observed by the objective lens 17 were captured. FIG. 7 shows the result when the first reflective part 3 was disposed at the position satisfying $\phi=0°$.

As shown in FIG. 6, in the case of the example of the present invention in which the first reflective part 3 was disposed at the position satisfying $\phi=6°$, as a distance S increased, intensity of the reflective beam became slightly weaker. Furthermore, although a central position of the reflected beam deviates aside, the intensity of the reflected beam was prevented from being too strong, and the reflective beam was easily observed, thus the adjustment of the optical axis was easily carried out. In addition, when the distance S is +, this represents that the probe 99 is located to be closer to the objective lens 17 (upper portion) than the surface of the sample 18. Also, when the distance S is −, this represents that the inclined surface block 11 is dismantled so that the cantilever 4 is removed, and only a reflected beam from the surface of the sample 18 is observed.

Meanwhile, as shown in FIG. 7, in the case of the comparative example in which the first reflective part 3 was disposed at the position satisfying $\phi=0°$, the distance S was not referred to, and the central position of the reflected beam is not changed. Furthermore, although the adjustment of the optical axis could be performed using the objective lens 17, it was difficult to observe the reflective beam because intensity of the reflected beam was too strong. Also, since the first reflective part 3 blocked the optical axis O of the objective lens 17, a resolution of the objective lens 17 was decreased when the sample 18 was observed by the objective lens 17.

Although the embodiments of the present invention have been disclosed for illustrative purposes, those skilled in the art will appreciate that various modifications, additions and substitutions are possible, without departing from the scope and spirit of the invention as disclosed in the accompanying claims.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. A scanning probe microscope, comprising:
   a cantilever having a probe that is positioned close to a surface of a sample;
   a light source part radiating beams;
   a first reflective part reflecting an incident beam (L0) radiated from the light source part and guiding the incident beam to a reflective surface installed at the cantilever;
   a light receiving part receiving the beams;
   a second reflective part reflecting a reflected beam (L1) reflected from the reflective surface and guiding the reflected beam to the light receiving part; and
   an objective lens disposed to face the cantilever and adopted to observe and capture an area around the cantilever, the objective lens having the number of openings of NA,
   wherein the first reflective part is disposed at a position between the objective lens and the cantilever such that an angle ($\phi$) between an optical path of the incident beam (L0) reflected from the first reflective part, and an optical axis (O) of the objective lens is $0°<\phi<\theta$, where $\theta$ is an opening angle (°), and $NA = n \cdot \sin\theta$, n representing an index of refraction of a medium between the objective lens and the cantilever.

2. The scanning probe microscope as set forth in claim 1, wherein the first reflective part is disposed at a position that satisfies $3° \leq \phi \leq 10°$.

3. The scanning probe microscope as set forth in claim 1, wherein the second reflective part is disposed at a position between the objective lens and the cantilever such that an optical path of the reflected beam (L1) reflected from the reflective surface, and the optical axis (O) of the objective lens is greater than $\theta$.

4. The scanning probe microscope as set forth in claim 1, further comprising a radiation position adjusting mechanism adjusting a position, in which the incident beam (L0) is radiated to the reflective surface, in such a manner as to adjust a position of the light source part by being connected to the light source part.

5. The scanning probe microscope as set forth in claim 1, further comprising a light receiving position adjusting mechanism adjusting a position, in which the reflected beam (L1) is received in the light receiving part, in such a manner as to adjust a position of the light receiving part by being connected to the light receiving part.

6. The scanning probe microscope as set forth in claim 1, further comprising a sample stage on which the sample is placed, wherein the sample stage has a cantilever feed mechanism that can maintain one or more cantilevers.

7. The scanning probe microscope as set forth in claim 1, further comprising a sample stage on which the sample is put, wherein the sample stage is movable to be laid over the probe in the optical direction (O) upon measurement of the sample.

8. The scanning probe microscope as set forth in claim 7, wherein the sample stage maintains the cantilever in a same direction as a direction upon the measurement, and the sample stage having an optical reflective surface for matching an optical axis of the incident beam with the cantilever and reflecting the incident beam (L0).

* * * * *